United States Patent Office 2,791,404
Patented May 7, 1957

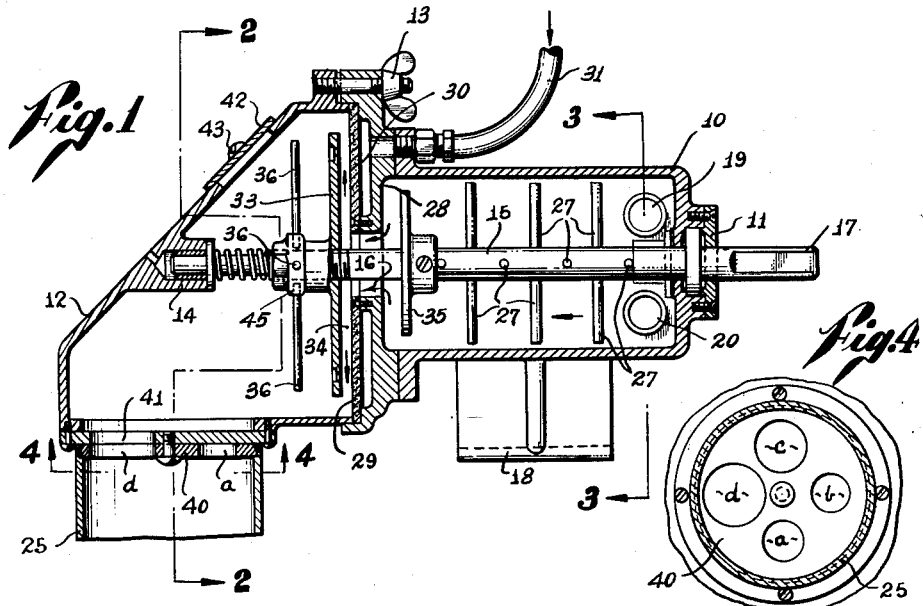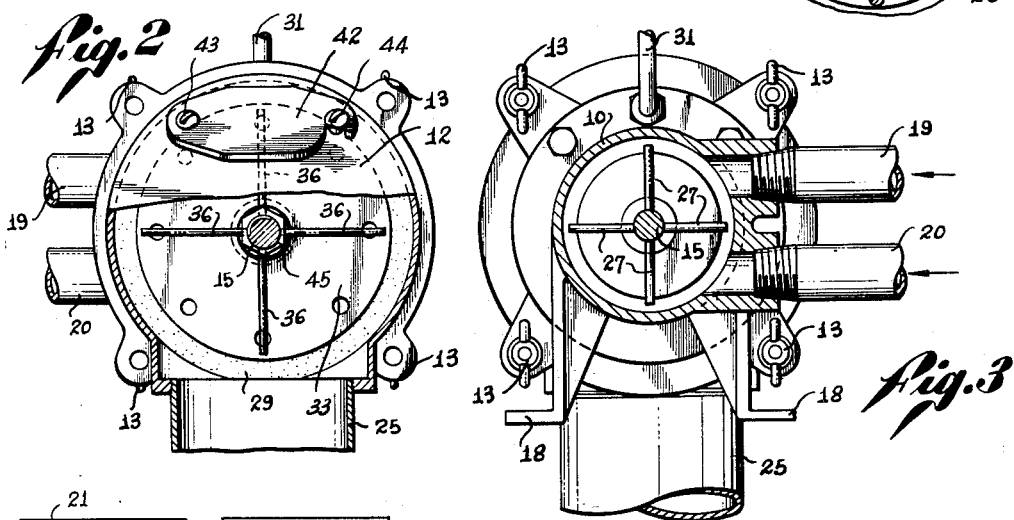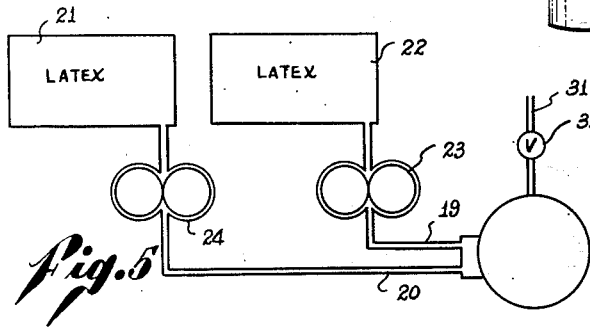

2,791,404

APPARATUS FOR MAKING CELLULAR PRODUCTS

John Hugh Kelly, Jr., deceased, late of East Los Angeles, Calif., by Mildred M. Kelly, administratrix, Los Angeles, Calif., and Rosalind M. Glassco and Donald E. Glassco, Temple City, and John W. White, North Hollywood, Calif.; said Rosalind M. Glassco, said Donald E. Glassco, and said John W. White assignors to Mildred M. Kelly, Los Angeles, Calif.

Application May 29, 1953, Serial No. 358,516

13 Claims. (Cl. 259—9)

This invention relates generally to apparatus for producing cellular products and more particularly to the aerating or foaming of liquids preparatory to gelling and curing.

In the production of foam rubber it has been the practice to foam the rubber latex dispersion by beating or whipping air into it, or in some instances to inject air into the liquid by a plurality of hypodermic needles. These methods are reasonably satisfactory in batch operations, but are not practical in a continuous process.

The major object of this invention is to provide apparatus for the continuous production of cellular products, particularly foam rubber and other cellular rubbery products.

Another object of the invention is the provision of apparatus whereby a plurality of latex dispersions can be continuously mixed, foamed and then discharged into molds.

A further object is to provide apparatus which can be relatively small in size and economical in construction but which can, by reason of its continuous operation, produce relatively large quantities of foamed product rapidly and cheaply.

It is also an object to provide apparatus of the character described which produces a finer and more homogenous cell structure in the resulting product than has been possible in the past.

Still another object of the invention is the provision of apparatus which can be readily and accurately controlled during operation and which can be easily disassembled for cleaning whenever it is shut down.

The apparatus of this invention is particularly well suited to the continuous process of foam rubber production described and claimed in the co-pending application of John Hugh Kelly, Jr., Serial No. 329,918, filed January 6, 1953, now abandoned.

The stated and other objects and advantages of this invention will be apparent from the following description of a preferred form thereof and from the attached drawing in which Fig. 1 is a vertical longitudinal section of the mixing and foaming apparatus;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1; and

Fig. 5 is a schematic view of the entire apparatus including the tanks and pumps.

Referring now to the drawings and particularly to Fig. 1 thereof, the numeral 10 indicates a cylindrical mixing chamber having one end closed by a cap 11 and its other end connected to a foaming chamber 12 by any suitable means such as wing nuts 13. The foaming chamber 12 is provided on the inner face of its outer wall with a bearing mount 14 from which a rotatable shaft 15 extends through an aperture or passage 16 axially connecting the chambers 10 and 12. The other end of shaft 15 is mounted in a bearing in the cap 11 and extends therethrough. The outer end 17 of the shaft 15 is adapted to be connected to a source of power not shown. Suitable means such for example as flanged legs 18 are supplied for mounting the machine.

The mixing chamber 10 is shown with two inlet pipes 19 and 20 attached thereto, leading respectively from latex supply tanks 21 and 22 (see Fig. 5). The pipes 19 and 20 have respectively therein positive displacement pumps 23 and 24, such as gear pumps or the like, to simultaneously feed controlled amounts of the latices to the mixing chamber 10. The discharge side of the foaming chamber 12 is provided with a discharge pipe 25 of suitable shape and size, and which may be variable in length and diameter as desired to vary the effective size of the discharge chamber 12.

The rotary shaft 15 is provided with a plurality of radial rods or paddles 27 spaced around its periphery and along its length for thoroughly mixing the liquids entering the chamber 10 through the inlets 19 and 20. A circular plate or disc 35 is fastened on the shaft 15 adjacent the aperture 16. Since the liquids are introduced under substantial pressure they will travel along the chamber 10 and through the aperture 16 into the foaming chamber 12. It will be noted that the net passage area of the aperture 16 after deduction of the area of the shaft 15 passing therethrough is somewhat restricted, and that the passage around the periphery of disc 35 and between it and the aperture 16 are also restricted, thus creating sufficient back pressure on the material in chamber 10 to insure adequate mixing thereof before discharge from said chamber.

The inner wall of the foaming chamber 12, i. e., that adjacent to the end wall 28 of mixing chamber 10, is formed by a removable porous plate or disc 29 made of powdered metal, preferably stainless steel. The disc 29 is preferably made of metal particles of uniform size, laid out in the form of sheets and heat-treated to form a strong ductile highly porous sheet material. While pores of various size can be used it has been found that discs having pores of the order of 5 microns (.0002") are very suitable in producing foam rubber.

The wall or plate 29 is apertured at its center register with aperture 16 and is preferably secured to the boss on end wall 28 forming the aperture 16 to make a tight fit therewith. The perimeter of plate 29 is rigidly secured between the mixing chamber 10 and foaming chamber 12 to form an annular chamber 30 between the plate 29 and the wall 28. Gas, preferably air, under substantial pressure is supplied to chamber 30 by means of an inlet tube 31 having a pressure regulating valve 32 therein (see Fig. 5).

Closely adjacent and parallel to porous plate 29 is a baffle plate 33 threaded on shaft 15 and rotatable therewith. The position of baffle plate 33 on shaft 15 is adjustable so as to vary the space 34 between the baffle and plate 29, which space serves as a passage for the liquid flowing through the aperture 16. By restricting the space 34 to a relatively small width, the latex mixture is forced to flow over the face of porous plate 29 and be subjected to the multiplicity of air streams emerging therefrom. Since this layer of flowing latex is therefore relatively thin, a multiplicity of small air bubbles will be formed throughout its mass before it passes out around the periphery of the baffle plate 33 into the main part of chamber 12. The rotation of the baffle plate facilitates movement of the material radially outwardly across the plate and tends to equalize the flow across all parts thereof.

If desired, and it is sometimes advisable, a plurality of radial fingers 36 may be provided on the shaft 15 between the baffle 33 and the bearing 14 to break up any large bubbles that may form in the material being foamed.

The size of the bubbles in the foamed material depends among other things on the back pressure in the chamber 12. It is therefore advisable to have the discharge therefrom of variable size. One satisfactory means for accomplishing this is to provide an apertured discharge plate 40 having a series of apertures $a$, $b$, $c$ and $d$ therein of progressively larger size, all of which are adapted to register, as plate 40 is rotated about its center, with discharge aperture 41 in the discharge wall of chamber 12.

To facilitate adjustment of the foaming space 34, the chamber 12 is provided with a removable cover plate 42 swingable about a stud 43 from a closed position locked under a companion stud 44 to an open position to permit ready access to baffle plate 33 and its adjusting nut 45 on shaft 15. In this connection, it has been found that for apparatus using a 5" porous disc 29 and a 4" baffle disc 33, a suitable width for the space 34 therebetween is approximately $3/16$". This will of course vary with the type and viscosity of the latices used, the air pressure in chamber 30 and the mean size of the pores in plate 29.

In the operation of the apparatus in the continuous production of foam rubber, the tanks 21 and 22 are filled with the appropriate latices and pumps 23 and 24 are operated to continuously introduce measured amounts of the latices under pressure into the mixing chamber 10. The latices are thoroughly intermixed by the rotation of paddles 27 assisted by the tangential positions of the inlet pipes 19 and 20 which promote turbulence and ready mixing of the latices. The mixture then passes through aperture 16 and spreads radially across porous wall 29, being confined thereto by baffle plate 33, so as to be thoroughly foamed by the multiplicity of very fine air blasts issuing from porous plate 29. In accordance with the process of said co-pending Kelly application, one of the latices will have therein a gelling agent adapted to initiate gelling of the other latex and the timing in the apparatus will therefore be such that complete intermixing and foaming are had and the mixture discharged from the machine before noticeable gelling takes place. It will be readily appreciated that by the apparatus herein shown, all of the variables of the process can be readily and accurately controlled without complex auxiliary equipment.

While the apparatus herein shown is particularly applicable to the production of foam rubber by a process using two different latices which are admixed before frothing, it will be apparaent that the apparatus is likewise suitable in other processes where liquids are to be continuously frothed or foamed. Likewise, it will be apparent that while the form of the invention herein shown in detail is fully capable of attaining the objects and providing the advantages heretofor stated, modifications thereof can be made within the spirit of the invention and within the scope thereof defined by the appended claims.

We claim:
1. Apparatus of the character described which includes: a cylindrical mixing chamber having a plurality of inlets and an outlet; a rotary shaft extending axially through said chamber and provided with liquid agitating means thereon; a foaming chamber adjacent said mixing chamber and having as a part thereof a porous metal wall with a central aperture through which said shaft extends; a baffle plate mounted on said shaft to rotate therewith and closely adjacent one face of said porous wall to form a passage therewith; means for supplying gas under pressure to the other face of said porous wall for passage of a multiplicity of air blasts therethrough; and means for conducting foamable material from said mixing chamber to said passage between said porous plate and said baffle plate, said baffle being so spaced from said porous wall that said material will be subjected to a multiplicity of minute air blasts sufficient to thoroughly foam the same upon movement thereacross.

2. Apparatus of the character described which includes: a mixing chamber having a plurality of inlets for receiving foamable material from a continuous source of supply; a rotary shaft in said chamber provided with means for agitating the material in said chamber; an outlet passage in said chamber through which said shaft extends and through which said material may flow; an annular porous metal plate having a multiplicity of passages therethrough mounted adjacent said passage with its central opening in register therewith; means forming a gas receiving chamber between said plate and the adjacent wall of said mixing chamber for receiving gas under pressure; a baffle plate mounted on said shaft for rotation therewith adjacent and overlying said porous plate and forming therewith a passage of restricted width for said material during movement radially across said plate to receive a multiplicity of air blasts therefrom sufficient to thoroughly foam the same; means forming a chamber for receiving said foamed material, said chamber having a discharge port; and adjustable means for varying the effective size of said discharge port.

3. Apparatus of the character described which includes: means forming a mixing chamber and a foaming chamber having adjacent walls with aligned apertures connected by passage means, and outer walls provided with aligned bearings; a shaft extending through said passage and rotatably mounted in said bearings; radial beater elements on said shaft in said mixing chamber; a plate on said shaft in said mixing chamber adjacent said passage to restrict flow thereinto; a baffle plate mounted on said shaft in said foaming chamber; a porous metal plate having an axial opening registering with said passage and mounted at the outlet end thereof; means for directing gas under pressure to the side of said porous plate distant from said baffle plate; means on a wall of said foaming chamber permitting access to said baffle plate to adjust the same, said baffle being so spaced from said porous plate as to cause the flow therebetween to be subjected to a multiplicity of air blasts sufficient to cause thorough foaming of the flow upon passage thereacross; agitator means on said shaft in said foaming chamber downstream from said baffle plate; and adjustable means for varying the discharge from said foaming chamber.

4. Apparatus of the character described which includes: means forming a mixing chamber and a foaming chamber fluid connected therewith, a porous metal plate in said foaming chamber; a baffle plate mounted adjacent one face of said porous plate to form a passage therewith; positive displacement means for supplying controlled amounts of foamable materials to said mixing chamber under pressure sufficient to cause them to flow into said foaming chamber and between said porous and baffle plates; means to supply gas under pressure to the other face of said porous plate to force gas therethrough to inject a multiplicity of minute gas jets into said materials flowing across said porous plate to thereby foam said materials, said baffle plate being so spaced from said porous plate as to cause thorough foaming of said material during the time it takes said material to flow across said porous plate; and means for discharging said foamed materials from said foaming chamber.

5. Apparatus of the character described which includes: a mixing chamber having inlet and outlet means for receiving and discharging liquids to be mixed and foamed; pump means for supplying a controlled amount of foamable liquid to said mixing chamber under pressure sufficient to cause it to emerge from said outlet means; means forming a passage for said liquid emerging from said outlet means, said passage having at least one of its walls porous; and means for conveying gas under pressure to said porous wall for passage therethrough, said gas flowing from said porous wall, as a multiplicity of minute high-velocity gaseous blasts, into the liquid passing across said porous wall to thoroughly foam said liquid.

6. Apparatus of the character described which includes: a mixing chamber having inlet and outlet means for receiving and discharging liquids to be mixed and foamed; means for agitating said liquids in said chamber; means including at least one porous wall said porous wall having its porosity extending over substantially the entire surface thereof and forming a passage for material emerging from said mixing chamber for directing said liquid to move across said porous wall; means for conveying gas under pressure to said porous wall for passage therethrough, said gas flowing from said porous wall, as a multiplicity of minute high-velocity gaseous blasts, into the material passing across said porous wall; and variable area discharge means for receiving and discharging said foamed material.

7. Apparatus of the character described which includes: means forming a mixing chamber and a foaming chamber connected therewith; a porous metal wall in said foaming chamber; positive displacement means for supplying a controlled amount of material to be foamed to said mixing chamber to move therefrom under pressure across one face of said wall; means for directing a flow of gas to the other face of said wall under sufficient pressure to flow therethrough, said gas flowing from said porous wall, as a multiplicity of minute high-velocity gaseous blasts, into said foamable material as said material moves across said wall, said foaming chamber having means for receiving and discharging said foamed material as it leaves said porous wall.

8. Apparatus of the character described which includes: a metal wall having a multiplicity of minute pores therethrough said pores extending over substantially the entire surface thereof; means for directing a flow of material to be foamed to move across one face of said wall; means for directing a flow of gas to the other face of said wall under sufficient pressure to pass therethrough, said gas flowing from said porous wall, as a multiplicity of minute high-velocity gaseous blasts, into said foamable material as said material moves across said wall; and means for receiving and discharging said foamed material as it leaves said porous wall, said last mentioned means including a chamber with a variable area discharge aperture therein whereby the back pressure on said foamed material can be varied at will.

9. Apparatus of the character described which includes: means forming a mixing chamber and a foaming chamber connected therewith; an annular porous metallic plate in said foaming chamber having an axial opening therein; means forming with said plate a gas receiving chamber on one side of said plate; means for supplying gas under pressure to said gas chamber for directing a multiplicity of minute high-velocity air blasts through said porous plate; a baffle plate overlying the other side of said porous plate and closely adjacent thereto; means for varying the width between said porous plate and said baffle plate; pump means for supplying a controlled amount of foamable liquid into said mixing chamber and through the axial opening in said porous plate under a pressure sufficient to cause it to move radially across and between the face thereof and said baffle plate, and means forming a chamber to receive said foamed material after its passage across said porous plate, and to discharge the same, said baffle being so spaced from said porous plate as to cause said foamable liquid to flow so as to be thoroughly foamed by said multiplicity of air blasts upon moving across said porous plate.

10. Apparatus of the character described which includes: an annular porous metallic plate having a central opening therein and having its porosity extending over a major portion of the plate; means forming with said plate a gas receiving chamber on one side of said plate; a rotating baffle plate overlying the other side of said porous plate and closely adjacent thereto; means for directing a foamable liquid into and through the opening in said porous plate and across and between the face thereof and said baffle plate; means for supplying gas under pressure to said gas chamber to foam said material, said material being subjected to a series of minute high-velocity air blasts and said baffle plates being so spaced from said porous plate as to cause said material to flow across said porous plate and become thoroughly foamed upon passage thereacross; and means forming a chamber to receive said foamed material after its passage across said porous plate, said chamber having a variable aperture therein.

11. Apparatus of the character described which includes: a mixing chamber having inlet means for receiving liquids to be foamed; rotary means in said chamber for agitating the material therein; means forming an outlet passage to conduct said material from said mixing chamber to a foaming chamber having a wall of porous metal disposed to have said material flow over one face thereof; a baffle plate juxtaposed with said porous wall to confine said material to passage over said porous wall; and means for supplying gas under pressure to the other face of said porous wall to thereby inject gas, in the form of a multiplicity of minute high-velocity gaseous blasts, into said material and foam the same as it passes over said porous wall, said baffle being so spaced from said porous plate as to cause said material to be thoroughly foamed upon passage over said plate.

12. Apparatus of the character described which includes: a cylindrical mixing chamber having a plurality of inlets and an outlet; a rotary shaft extending axially through said chamber and provided with liquid agitating means thereon; a foaming chamber adjacent said mixing chamber and having as a part thereof a porous metal wall with a central aperture through which said shaft extends; a baffle plate mounted on said shaft to rotate therewith and closely adjacent one face of said porous wall to form a passage therewith; means for supplying gas under pressure to the other face of said porous wall for passage of a multiplicity of gaseous blasts therethrough; and means for conducting foamable material from said mixing chamber to said passage between said porous plates and said baffle plate, said baffle being so spaced from said porous wall that said material will be subjected to a multiplicity of said minute gaseous blasts sufficient to thoroughly foam the same upon movement thereacross.

13. Apparatus of the character described which includes: a mixing chamber having inlet means for receiving liquids to be foamed; rotary means in said chamber for agitating the material therein; means forming an outlet passage to conduct said material from said mixing chamber to a foaming chamber having a wall of porous metal disposed to have said material flow over one face thereof; a baffle plate juxtaposed with said porous wall to confine said material to passage over said porous wall; and means for supplying gas under pressure to the other face of said porous wall to thereby inject gas in the form of minute high-velocity gaseous blasts into said material and foam the same as it passes over said porous wall, and to variably discharge said foamed material, said baffle being so spaced from said porous plate as to cause said material to be thoroughly foamed upon passage over said plate.

References Cited in the file of this patent

UNITED STATES PATENTS

| | | |
|---|---|---|
| 1,372,172 | Larsen | Mar. 22, 1921 |
| 1,737,624 | Thomson | Dec. 3, 1929 |
| 1,748,107 | Bulchert | Feb. 25, 1930 |
| 1,885,785 | Thomson | Nov. 1, 1932 |
| 2,038,451 | Schattaneck | Apr. 21, 1936 |
| 2,252,076 | Juterbock | Aug. 12, 1941 |
| 2,320,469 | Rasmussen | June 1, 1943 |
| 2,352,767 | Booth et al. | July 4, 1944 |